United States Patent [19]
Klein

[11] Patent Number: 5,384,791
[45] Date of Patent: Jan. 24, 1995

[54] MEASURING WORST CASE SUSCEPTIBILITY OF DIGITAL MICROWAVE RADIOS TO MULTIPATH FADING

[75] Inventor: Matthew Klein, Mountain View, Calif.

[73] Assignee: Hewlett-Packard Company, Palo Alto, Calif.

[21] Appl. No.: 844,801

[22] Filed: Mar. 2, 1992

[51] Int. Cl.⁶ .......................................... H04B 17/00
[52] U.S. Cl. ................................. 371/5.1; 375/10; 455/67.3; 455/67.4; 455/67.5; 455/226.1
[58] Field of Search .............. 455/226.1, 67.1, 67.3, 455/67.4, 67.5; 375/10; 371/5.1, 5.5

[56] References Cited

U.S. PATENT DOCUMENTS

| | | | |
|---|---|---|---|
| 4,679,248 | 7/1987 | McKeown | 455/226.1 |
| 4,766,600 | 8/1988 | Martin | 375/10 |
| 4,977,607 | 12/1990 | Maucksch et al. | 455/10 |
| 5,025,453 | 6/1991 | Hurinville | 375/10 |
| 5,062,148 | 10/1991 | Edwards | 455/52 |

OTHER PUBLICATIONS

Tjhung, T. et al., "Error Rates for Narrow–Band Digital FM with Discriminator Detection in Mobile Radio Systems," *IEEE Trans. Comm.*, vol. 38, No. 7, Jul. 1990, pp. 999–1005.

Hoffmeyer, J., "Measurement Modeling and Simulation of Digital LOS Microwave Channels . . .", *IEEE Trans. Comm.*, vol. 39, No. 9, Sep. 1991, pp. 1295–1305.

*Primary Examiner*—Stephen M. Baker
*Attorney, Agent, or Firm*—William C. Milks, III

[57] ABSTRACT

In a system for transmitting a digital signal over a signal path, such as a digital microwave radio, a method for finding worst case susceptibility of digital microwave radios to multipath fading. Signal notch depth at a given signal frequency is adjusted until a selected initial bit error rate occurs. Thereafter, the signal path is broken and then reestablished. If the measured bit error rate is greater than the initial bit error rate, the resulting bit error rate is measured, and the notch depth is decreased and then gradually increased, until the measured bit error rate is equal to or slightly exceeds the initial bit error rate. If the measured bit error rate is equal to the initial bit error rate, the signal path is broken and reestablished additional times until an accurate representation of worst case signal propagation is obtained. If the measured bit error rate is less than the initial bit error rate, the value of notch depth for the initial bit error rate is returned as the worst case value. In this way, worst case susceptibility of a digital microwave radio to multipath fading is indicated by notch depth.

19 Claims, 3 Drawing Sheets

MEASURING WORST CASE SUSCEPTIBILITY OF DIGITAL MICROWAVE RADIOS TO MULTIPATH FADING

BACKGROUND OF THE INVENTION

1. Technical Field

The present invention relates to the transmission of digital signals via digital microwave radio. More particularly, the present invention relates to measuring the susceptibility of digital microwave radios to multipath fading.

2. Description of The Prior Art

A valuable way of assessing the performance of a digital microwave radio ('DMR') with regard to a propagated microwave signal is to measure the DMR receiver's susceptibility to multipath fading. In FIG. 1, a transmitter 10 is shown sending a signal to a receiver 12 over multiple signal paths, variously shown as a direct and intended path 15, and as a reflected path 14 and a ground bounce path 16. Due to the differences in distance the various signals travel over the multiple paths, they arrive at the receiver 12 at slightly different times. Thus, there is often signal fade due to phase difference cancellation between the signals. Testing susceptibility to multipath fading is particularly important since fading is recognized as one of the predominant causes of unacceptable data bit error rates and link outages.

The DMR's susceptibility to multipath fading is measured using the M-curve measurement which was developed by the British telecommunications industry. The M-curve is a measure of the depth of a notch at a particular position in the frequency band of a DMR which causes the DMR to experience a given bit error rate ('BER').

The M-curve measurement is typically made as follows: The DMR transmitter IF output is coupled to the input of a multipath fading simulator, such as the HP 11757B manufactured by Hewlett-Packard Company of Palo Alto, Calif. The output of the multipath fading simulator is coupled to the IF input of the DMR receiver. The BER is monitored while the transmit and receive paths of the DMR are exercised.

When no fade is occurring, the BER is zero. For any point to be plotted on the M-curve, a notch is imposed in the IF band of the DMR at a specific frequency, while the BER is monitored. The notch is slowly increased in depth until a specific BER is reached, for example 0.0001. The same measurement is repeated at different frequency points within the IF of the DMR. When the resulting measurements of notch depth versus frequency are plotted the resulting curve gives an indication of the DMR's susceptibility to multipath fading.

Normally, data provided to a DMR are converted in a DMR transmitter to 'In-phase' or 'I' signals and 'Quadrature' or 'Q' signals. These signals are used to modulate a baseband carrier having a typical frequency of 70 MHz or 140 MHz. The modulated carrier is then up-converted to a much higher frequency and transmitted over a signal path.

At the receiving end of the signal path, a DMR receiver down-converts the high frequency 'IQ' modulated signal to the 70 MHz of 140 MHz baseband signal, demodulates the 'I' and 'Q' signals, and converts the 'I' and 'Q' signals back into digital data.

In the DMR transmitter, the 'I' and 'Q' signals each go through a separate filter. In the DMR receiver, the demodulated 'I' and 'Q' signals also each go through a separate filter. The purpose of the filters is to provide an overall transmit-to-receive characteristic which minimizes intersymbol interference.

The receiver in a DMR functions such that the 'I' transmitted signal can be received by either the 'I' or the 'Q' receive filter. Similarly, the 'Q' transmitted signal can be received by either the 'Q' or the 'I' receive filter. Accordingly, there are two different sets of transfer characteristics possible for a propagated signal. The two sets of transfer characteristics (two transmit and two receive filter characteristics) may be expressed as follows:

HITR(S) > 'I' transmit filter frequency response;
HQTR(S) > 'Q' transmit filter frequency response;
HIRC(S) > 'I' receive filter frequency response; and
HQRC(S) > 'Q' receive filter frequency response.

Thus, the two sets of overall transfer characteristics are:

Set 1: HITR(S)*HIRC(S), HQTR(S)*HQRC(S)
Set 2: HITR(S)*HQRC(S), HQTR(S)*HIRC(S).

Ideally, HITR(S), HIRC(S), HQTR(S), and HQRC(S) are all equal. However, it is both difficult and expensive to produce filters having identical transfer characteristics. Thus, in practice the filters are not identical or perfect, and the two sets of transfer characteristics each have a slightly different effect on intersymbol interference.

The two sets of transfer characteristics are referred to as lock states wherein the DMR 'locks' up with 'I'—'I', 'Q'—'Q' or 'I'-'Q', 'Q'-'I' for the transmit-to-receive signal path. FIG. 2 is an x-y graph of six M-curves plotting notch depth in decibels versus notch frequency in MHz. The M-curves shown were measured without regard to the different lock states. The numbers on each curve indicate the number of data points falling on the curve at that frequency. The two curves show the two different lock states which occured during the data acquisition process. The distance between the curves is an indication of the inaccuracy of known techniques for establishing the M-curve.

It is not possible to force the DMR to select the best set of transfer characteristics. Accordingly, it is desirable to measure DMR sensitivity on the worst set of transfer characteristics. The M-curve measurement described above does not provide for using worst case lock state.

SUMMARY OF THE INVENTION

The present invention is useful in a system for transmitting a digital signal over a signal path, for example in a digital microwave radio. The invention provides a method for finding the susceptibility of the digital microwave radio to multipath fading. In the context of a digital microwave radio, the invention establishes a worst case lock state when measuring the M-curve for multipath fading. In the invention, a signal path is first established. Signal notch depth is adjusted at a given signal frequency until a selected initial bit error rate occurs. Thereafter, the signal path is first broken and then reestablished. The bit error rate is measured. If the measured bit error rate is greater than the initial bit error rate, the signal notch depth is first decreased and then gradually increased until the measured bit error rate is equal to the initial bit error rate. If the measured bit error rate is equal to the initial bit error rate, the signal path may be repeatedly established and broken, causing the DMR to lose lock and regain lock in one of the two lock states. A different lock state may be realized when lock is regained. Accordingly, the invention exercises both possible lock states to establish worst case lock. Thus, worst case digital microwave radio lock state is readily determined, as indicated by notch depth.

DETAILED DESCRIPTION OF THE INVENTION

Figure 1:
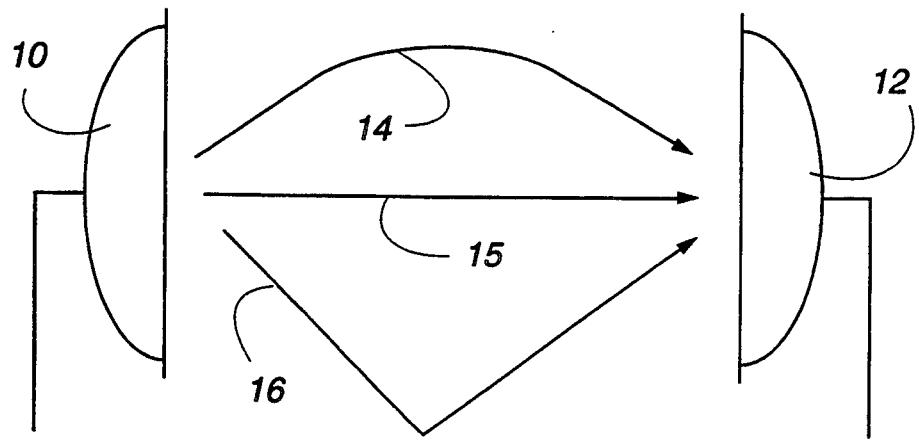
FIG. 1 is a block diagram showing a multiple signal path from a transmitter to a receiver.

The present invention is best understood by referring to the Drawings in connection with review of this Description. The present invention provides a method for establishing worst case lock state in a digital microwave radio ('DMR') when plotting multipath fading along an M-curve.

Figure 3:
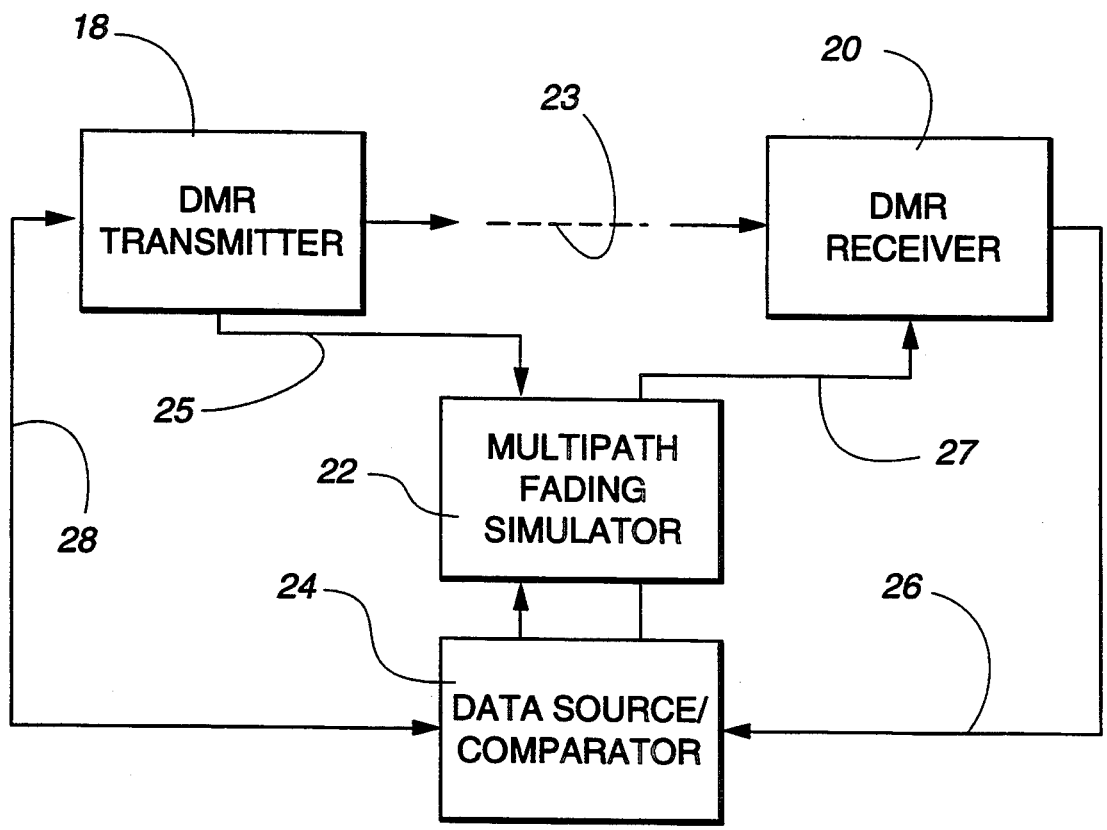
FIG. 3 is a block diagram showing an apparatus for determining worst case lock state during M-curve measurement according to the present invention.
Figure 2:
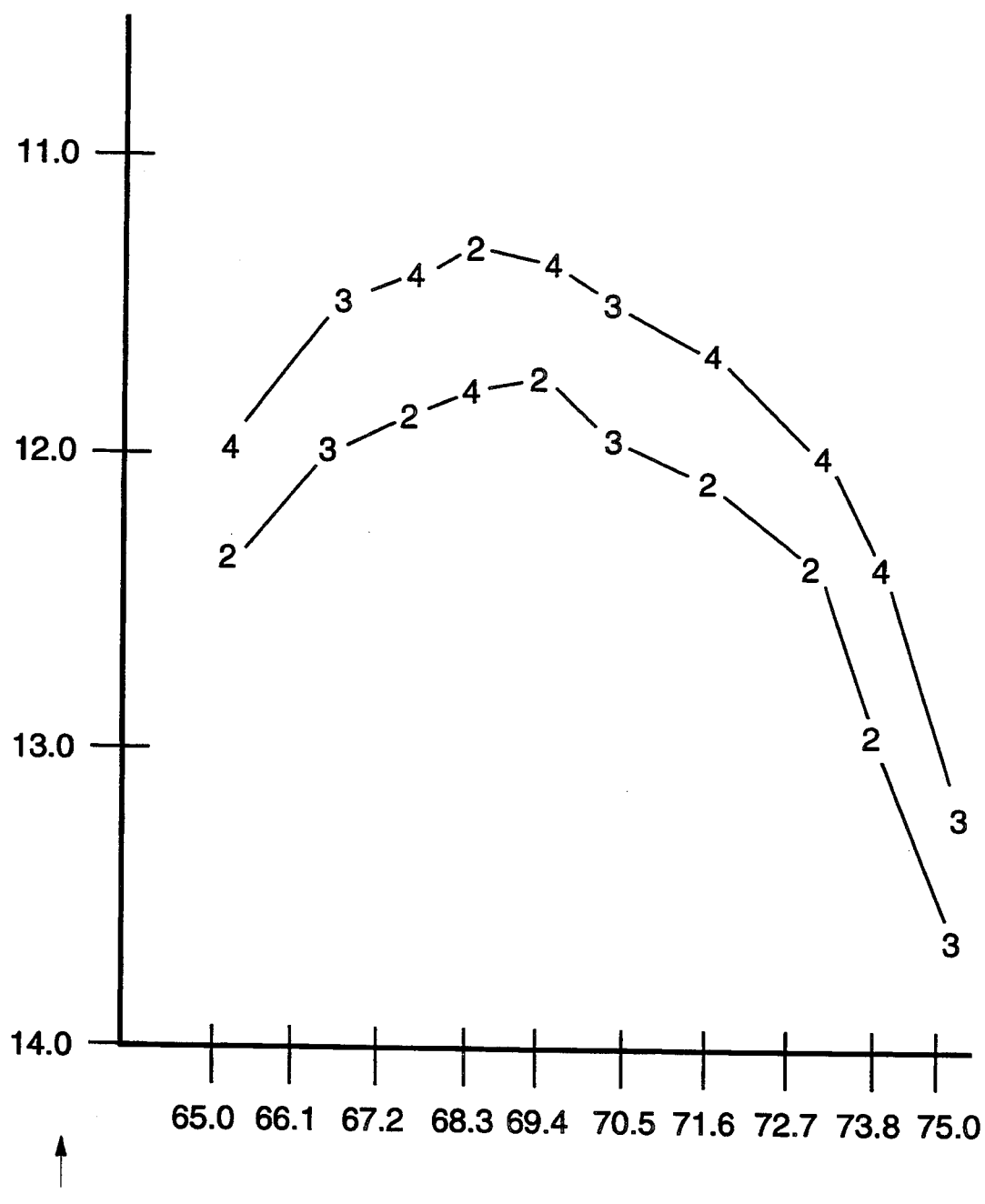
FIG. 2 is an x-y graph of notch depth versus notch frequency showing an M-curve plotted for six sets data.

FIG. 3 is a block diagram showing an apparatus for determining worst case lock state during the M-curve measurement. A DMR transmitter 18 transmits a digital signal over a signal path 23 to a DMR receiver 20.

The preferred embodiment of the present invention employs a multipath fading simulator 22, such as the HP 11757B manufactured by Hewlett-Packard Company of Palo Alto, Calif. Simulator 22 is coupled via line 25 to an IF output of DMR transmitter 18 and via line 27 to an IF input of DMR receiver 20. In operation, a single DMR is typically supplied having a transmitter IF output looped back via simulator 22 to a receiver IF input. In this way lock state information obtained via simulation accurately represents actual operation of the DMR during multipath fading.

The preferred embodiment of the invention additionally employs a data source/comparator 24 coupled via a line 28 to a digital data input of DMR transmitter 18 and coupled via a line 26 to a digital data output of DMR receiver 20. In operation, a digital bit stream is supplied by data source/comparator 24 and processed within DMR transmitter 18 to produce the 'I' and 'Q' signals used to modulate the DMR transmitter baseband carrier. After simulated fading within simulator 22, the baseband carrier is input to DMR receiver 20 where it is demodulated to yield the 'I' and 'Q' signals which are, in turn, processed to provide a digital data stream corresponding to the data stream previously provided to the DMR transmitter.

Data source/comparator 24 is programmable to provide a selected data rate. Because simulator 22 produces fading events that cause the loss of data from the digital bit stream, the input data can be compared with the output data. The rate at which any errors occur, divided by the input data rate is referred to as the bit error rate ('BER'). The BER expresses the impact of multipath fading on signal propagation and predicts DMR performance during such events. During operation, simulator 22 may be adjusted to provide a spectrum notch, expressed in decibels, such that a selected BER may be achieved for a given notch depth. This essentially describes the M-curve.

Figure 4:
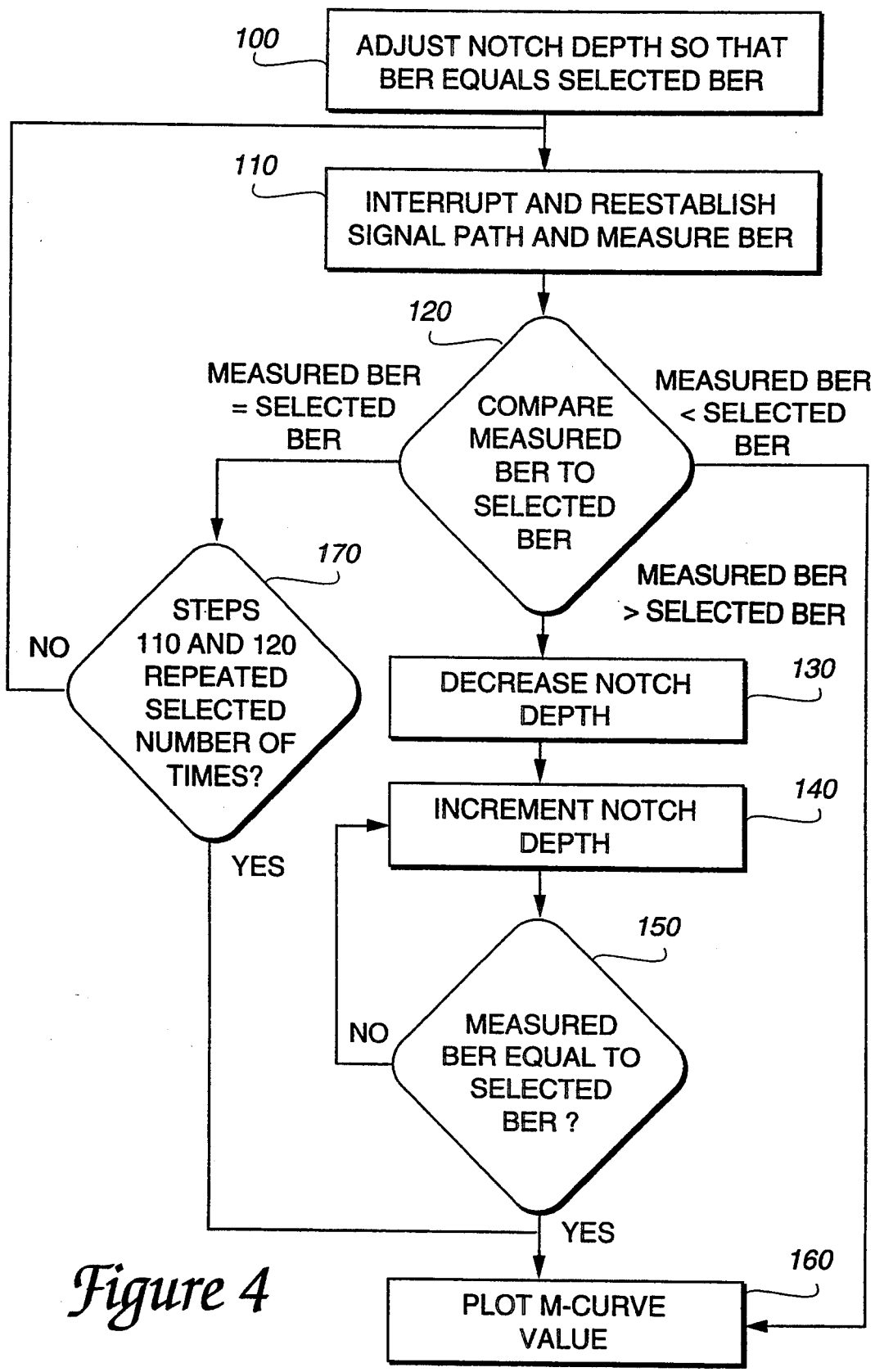
FIG. 4 is a flow diagram of a process for determining worst case lock state during M-curve measurement according to the present invention.

The present invention provides the following method for measuring the M-curve such that the DMR is exercised to establish a worst case lock state. Referring to FIG. 4, which is a flow diagram showing the method set forth herein, a DMR is set up as described above to perform an M-curve measurement. The notch depth is adjusted until a measured BER is equal to a selected initial BER (100).

At this point, the DMR will be locked into one of its two lock states. The signal path is interrupted (110) such that DMR lock is lost. The signal path is then reestablished and, while maintaining the original notch depth, the resulting BER is measured. The resulting measurement is tested (120) and compared with the initial selected BER. In this way, a representation of the new lock state is obtained.

There are three possible outcomes when the signal path is reestablished and lock returned: the new BER is equal to the initial BER, the new BER is less than the initial BER, or the new BER is greater than the initial BER. If the new BER is significantly different than that previously measured (for example, more than 100% above or 40% below in the preferred embodiment of the invention), it can be assumed a different lock state was found.

If the new BER is equal to the initial BER (120) the signal path is again interrupted and reestablished (110) and a resulting BER is measured and compared with the initial BER (120). If the initial BER and the newly resulting BER are again equal to each other, then process of interrupting and reestablishing the signal path may again be repeated until a different lock state is found. This pattern may be repeated as the application requires until a selected number of tests have been performed (170), at which point an accurate M-curve value is returned (160).

Repetitive breaking and reestablishing of the signal path may continually result in the same measured BER, indicating that the characteristics of both lock states are similar. Thus, worst case lock state is always tested.

A different BER returned at any point during the process of signal path interrupt indicates the worst case lock state as follows: If the different BER is larger than the BER previously returned, then the present lock state is the worst case lock state. If the different BER is smaller than the BER previously returned, then the previous lock state was the worst case lock state. Noting notch values for each test (breaking of the signal path) preserves worst case lock state data for use in plotting an M-curve. At the point a BER value is obtained that is different from a previous BER value (or different from the initial BER value), testing proceeds as described below.

If the measured BER is much less than the initial or previous BER (120), then the previous BER value was the worst case value. Thus, the current value for notch depth is that for worst case lock state (160).

If the measured BER is greater than the initial or previous BER (120), then the notch depth is decreased significantly, e.g., by 2.0 dB (130), to allow the test to proceed without the introduction of hysteresis or other effects which might render the results inaccurate. The notch depth is then increased gradually, e.g., in 0.10 dB increments (140). The BER is monitored (150) and the adjustment proceeds until the measured BER is equal to the initial BER. The value thus returned is the notch depth for worst case lock state (160).

It is important that the above tests proceed quickly without sacrificing accuracy. One aspect of the present invention provides an additional procedure for rapidly determining the notch depth at the initial BER. In operation, to establish BER notch depth is adjusted in large increments until the BER is exceeded. Thereafter, the notch depth is decreased to the point at which the BER is not exceeded, and the notch depth is then increased in smaller increments until the actual notch depth is determined.

The goal of the measurement provided by the present invention is to assist in predicting the uptime of a DMR. The present invention uniquely permits one to find worst case susceptibility of a DMR to multipath fading. There has heretofore been no method available in the art for measuring the M-curve with regard to lock states. Thus, the present invention provides a more accurate representation of DMR performance during multipath fading than achieved with a standard M-curve measurement.

Although the invention is described herein with reference to the preferred embodiment, one skilled in the art will readily appreciate that additional applications, other than those set forth herein, may be substituted therefor without departing from the spirit and scope of the present invention. For example, the method of the present invention may be implemented in combinational logic hardware, or in a software program, or it may be manually performed. Also, although the procedure set forth above describes an 'outage' signature measurement, a 'return' signature measurement may also be performed, as would be appreciated by one skilled in the art, without departing from the scope and spirit of the present invention. Additionally, the present invention may also be practiced as an apparatus in which each method step has a hardware analog. Accordingly, the invention should only be limited by the Claims included below.

I claim:

1. In a system for transmitting a digital signal over a signal path, a method for finding worst case susceptibility of the system to multipath fading, comprising the steps of:
   establishing a signal path;
   adjusting signal notch depth at a given signal frequency until a selected initial bit error rate occurs;
   breaking the signal path;
   reestablishing the signal path;
   measuring the bit error rate;
   establishing the relationship between the measured bit error rate and the initial bit error rate; and
   (i) if the measured bit error rate is greater than the initial bit error rate, decreasing and then gradually increasing the signal notch depth, until the measured bit error rate is equal to the initial bit error rate; and
   (ii) if the measured bit error rate is equal to the initial bit error rate, breaking and reestablishing the signal path at least one additional time and, thereafter, remeasuring the bit error rate, to determine if a notch depth for the initial bit error rate coincides with the notch depth for worst case susceptibility to multipath fading; and
   (iii) if the measured bit error rate is less than the initial bit error rate, returning the notch depth value for the initial bit error rate as the worst case notch depth;
   wherein worst case susceptibility to multipath fading is established by notch depth.

2. In a digital microwave radio system having at least two lock states, a method for finding worst case lock state during measurement of multipath fading over a signal path, comprising the steps of:
   establishing a signal path;
   adjusting signal notch depth at a given signal frequency until a selected initial bit error rate occurs;
   breaking the signal path;
   reestablishing the signal path;
   measuring the bit error rate;
   comparing the initial bit error rate with the measured bit error rate; and
   (i) if the measured bit error rate is greater than the initial bit error rate, decreasing signal notch depth by a large amount and then gradually increasing the signal notch depth by smaller increments, until the measured bit error rate is equal to the initial bit error rate; and
   (ii) if the measured bit error rate is equal to the initial bit error rate, breaking and reestablishing the signal path at least one additional time, and thereafter remeasuring the bit error rate; and
   (iii) if the measured bit error rate is less than the initial bit error rate, returning the notch depth value for the initial bit error rate as the worst case notch depth;
   wherein worst case lock state is indicated by the smallest notch depth necessary to obtain a bit error rate measurement equal to the initial selected bit error rate.

3. The method of claim 2, wherein said breaking and reestablishing step is repeated a selected number of times such that a similar measured bit error rate for each repeated step indicates both lock states are close, wherein worst case lock state is indicated by notch depth.

4. The method of claim 2, wherein susceptibility to multipath fading is measured using an M-curve.

5. The method of claim 2, wherein said bit error rate measuring step further comprises:
   providing a digital data signal to a digital microwave radio transmitter input;
   measuring a corresponding digital data signal from a digital microwave radio receiver output; and
   comparing the transmitter input and receiver output digital data signals to determine bit error rate.

6. The method of claim 2, wherein said notch depth adjusting step further comprises:
   rapidly adjusting notch depth until actual bit error rate approaches or exceeds the selected initial bit error rate; and
   slowly adjusting notch depth after actual bit error rate begins to approach or exceed the selected initial bit error rate and until actual bit error rate is equal to the selected initial bit error rate.

7. The method of claim 2, wherein said signal path is established by:
   coupling a digital microwave radio transmitter and receiver to a multipath fading simulator.

8. The method of claim 7, wherein said coupling step further comprises:
   coupling a digital microwave radio transmitter IF output to said multipath fading simulator; and coupling a digital microwave radio receiver IF input to said multipath fading simulator.

9. In a digital microwave radio system having at least two lock states and including a transmitter data input and IF output and a receiver data output and IF input, an apparatus for determining worst case digital microwave radio lock state, comprising:
- a multipath fading simulator for establishing a signal path corresponding to a first lock state, said multipath fading simulator including:
- a control for adjusting signal notch depth at a given signal frequency until a selected initial bit error rate occurs in the first lock state;
- an operable coupling for breaking the signal path and for reestablishing the signal path corresponding to the first lock state or a signal path corresponding to a second lock state;
- a counter for measuring the bit error rate upon reestablishment of the signal path; and
- a register for comparing the initial bit error rate with the measured bit error rate for determining the occurrence of the second lock state and the worst case lock state as corresponding to the greater of the initial and measured bit error rates.

10. The apparatus of claim 9, wherein said multipath fading simulator is coupled to said digital microwave radio transmitter IF output and to said digital microwave radio receiver IF input.

11. The apparatus of claim 9, wherein said multipath fading simulator is coupled to provide a digital data signal to said digital microwave radio transmitter input, and is coupled to receive a corresponding digital data signal from a digital microwave radio receiver output.

12. The apparatus of claim 9, wherein said control further comprises:
- a rapid mode for rapidly adjusting notch depth until actual bit error rate approaches or exceeds the selected initial bit error rate; and
- a slow mode for slowly adjusting notch depth after actual bit error rate begins to approach or exceed the selected initial bit error rate and until actual bit error rate is equal to the selected initial bit error rate.

13. The apparatus of claim 9, wherein if the measured bit error rate is equal to the initial bit error rate, the operable coupling causes the signal path to be broken and reestablished additional times until a determination of worst case lock state is obtained.

14. The apparatus of claim 9, wherein said control performs an M-curve measurement of worst case lock state by adjusting the signal notch depth for the worst case lock state at the given frequency until the initial bit error rate recurs.

15. The apparatus of claim 14, wherein if the measured bit error rate is greater than the initial bit error rate, the resulting bit error rate is measured by the counter, and the notch depth is decreased and then gradually increased by the control until the measured bit error rate is equal to or slightly exceeds the initial bit error rate, at which time the resulting notch depth provides a worst case value.

16. The apparatus of claim 14, wherein if the measured bit error rate is less than the initial bit error rate, the notch depth for the initial bit error rate provides a worst case value.

17. The apparatus of claim 14, wherein said multipath fading simulator is coupled to said digital microwave radio transmitter IF output and to said digital microwave radio receiver IF input.

18. The apparatus of claim 14, wherein said multipath fading simulator is coupled to provide a digital data signal to said digital microwave radio transmitter input, and is coupled to receive a corresponding digital data signal from a digital microwave radio receiver output.

19. The apparatus of claim 14, wherein said control further comprises:
- a rapid mode for rapidly adjusting notch depth until actual bit error rate approaches or exceeds the selected initial bit error rate; and
- a slow mode for slowly adjusting notch depth after actual bit error rate begins to approach or exceed the selected initial bit error rate and until actual bit error rate is equal to the selected initial bit error rate.

* * * * *